United States Patent
Sturgeon et al.

(10) Patent No.: US 8,785,209 B2
(45) Date of Patent: Jul. 22, 2014

(54) THIN-FILM PHOTOCHEMICAL VAPOUR GENERATION

(75) Inventors: Ralph Sturgeon, Orleans (CA); Chengbin Zheng, Chengdu (CN)

(73) Assignee: National Research Council of Canada, Ottawa (CA)

( * ) Notice: Subject to any disclaimer, the term of this patent is extended or adjusted under 35 U.S.C. 154(b) by 561 days.

(21) Appl. No.: 12/930,992

(22) Filed: Jan. 20, 2011

(65) Prior Publication Data

US 2011/0195519 A1 Aug. 11, 2011

Related U.S. Application Data

(60) Provisional application No. 61/336,529, filed on Jan. 21, 2010.

(51) Int. Cl.
- *G01N 33/00* (2006.01)
- *G01N 21/63* (2006.01)
- *G01N 1/44* (2006.01)

(52) U.S. Cl.
USPC ........................................ 436/181; 422/186.3

(58) Field of Classification Search
USPC ................ 422/50, 68.1, 83, 129, 186, 186.3; 436/181, 174
See application file for complete search history.

(56) References Cited

U.S. PATENT DOCUMENTS

| | | | |
|---|---|---|---|
| 3,610,760 A | 10/1971 | Lowe | |
| 3,644,045 A | 2/1972 | Walsh | |
| 3,897,155 A | 7/1975 | Smythe | |
| 3,914,054 A | 10/1975 | Hadeishi | |
| 4,730,111 A | 3/1988 | Vestal et al. | |
| 4,883,958 A | 11/1989 | Vestal | |
| 6,007,777 A * | 12/1999 | Purcell et al. | 422/80 |
| 6,407,383 B1 | 6/2002 | Byatt et al. | |
| 6,700,660 B2 | 3/2004 | Sabsabi et al. | |
| 2003/0197125 A1 | 10/2003 | De Saro et al. | |
| 2003/0228699 A1 | 12/2003 | Shade et al. | |

FOREIGN PATENT DOCUMENTS

| | | |
|---|---|---|
| CA | 2119113 A1 | 9/1995 |
| CN | 201138340 Y | 10/2008 |
| JP | 55063744 | 5/1980 |

OTHER PUBLICATIONS

Agemian H, Chau Asy. Anal. Chem. (1978) 50 (1), pp. 13-16.
Asfaw A, Wibetoe G. (2007) J. Anal. At. Spectrom. 22, 158-163.
Ding WW, Sturgeon RE. (1997) Anal. Chem. 69, 527-531.
Falter R, Scholer HF. J. Chromatogr. A. 675 (1994) 253-256.

(Continued)

*Primary Examiner* — Christopher A Hixson
(74) *Attorney, Agent, or Firm* — Ira S. Dorman

(57) ABSTRACT

A photochemical vapor generator is disclosed having a reaction chamber with a liquid sample inlet, a carrier gas inlet and a carrier gas outlet. A liquid sample support surface for supporting a film of a liquid sample is in the reaction chamber. A source of ultraviolet radiation is positioned in radiative contact with the liquid sample support surface. Also described is a process for detecting and/or quantifying an analyte by providing a liquid film of a sample containing an organic acid or a salt thereof and a precursor compound of the analyte, exposing the liquid film to ultraviolet radiation to generate a volatile species of the analyte, separating the volatile species from the liquid film to form a vapor containing the volatile species, and directing the vapor to a detector to detect and/or quantify the analyte in the vapor. Amalgamation of photochemical reactions with thin film generation and gas-liquid phase separation achieves the benefits of all of these principles in a single unit, providing a simple and effective way of enhancing generation of an expanded suite of elements.

24 Claims, 7 Drawing Sheets

(56) References Cited

OTHER PUBLICATIONS

Feng YL, Sturgeon RE, Lam JW. (2003) Anal. Chem. 75, 635-640.
Grinberg P, Mester Z, Sturgeon RE, Ferretti A. (2008) J. Anal. At. Spectrom., 23, 583-587.
Grinberg P, Sturgeon RE. (2009) J. Anal. At. Spectrom. 24, 508-514.
Guo X-M, Sturgeon RE, Mester Z, Gardner GJ. (2003) Environ. Sci. Technol. 37, 5645-5650.
Guo X-M, Sturgeon RE, Mester Z, Gardner GJ. (2004a) Anal. Chem. 75, 2092-2099.
Guo X-M, Sturgeon RE, Mester Z, Gardner GJ. (2004b) Anal. Chem. 76, 2401-2405.
He Y, Hou X, Zheng C, Sturgeon RE. (2007) Anal. Bioanal. Chem. 388, 769-774.
Maldonado D, Chirinos J, Benzo Z, Gomez C, Marcano E. (2006) J. Anal. At. Spectrom. 21, 743-749.
McLaughlin RL, Brindle ID. (2002) J. Anal, At. Spectrom. 17, 1540-1548.
Moor C, Lam JWH, Sturgeon RE. (2000) J. Anal. At. Spectrom. 15, 143-149.
Pohl P, Prusisz B. Anal. Bioanal. Chem. 388, 753-762, (2007).
Rojas I, Murillo M, Carrion N, Chirinos J. (2003) Anal. Bioanal. Chem. 376, 110-117.
Sturgeon RE, Mester Z. (2002) Appl. Spectrosc. 56, 202A-213A.
Tao GH, Sturgeon RE. (1999) Spectrochim. Acta, Part B. 54, 481-489.
Tekran Series 2600 product specification. Tekran Instruments Corporation (2006).
Tian X-D, Zhuang Z-X, Chen B, Wang W-R. (1998) Analyst. 123, 627-632.
Vieira ME, Ribeiro AS, Curtius AJ, Sturgeon RE. (2007) Anal. Bioanal. Chem. 388, 837-847.
Yin Yg, Liu JF, He B, Shi JB, Jiang GB. (2008) J. Chromatogr. A. 1181, 77-82.
Zheng CB, Li Y, He YH, Ma Q, Hou XD. (2005) J. Anal. At, Spectrom. 20, 746-750.
Zheng CB, Sturgeon RE, Hou XD. (2009a) J. Anal. At. Spectrom. 24, 1452-1458.
Zheng CB, Ma Q, Wu L, Hou XD, Sturgeon RE. (2009b) Microchem. J. in press, doi:10.1016/j.microc.2009.09.010.

* cited by examiner

THIN-FILM PHOTOCHEMICAL VAPOUR GENERATION

CROSS-REFERENCE TO RELATED APPLICATIONS

This application claims the benefit of U.S. Provisional Patent Application Ser. No. 61/336,529 filed Jan. 21, 2010, the entire contents of which is herein incorporated by reference.

FIELD OF THE INVENTION

The present invention is related to detection and/or quantification of an analyte in a sample. In particular, the present invention relates to photochemical apparatuses and processes for generating volatile species of an analyte from a sample containing non-volatile precursors of the analyte.

BACKGROUND OF THE INVENTION

Sample introduction for detection/quantification of trace elements by atomic spectrometry has relied greatly on the use of solution nebulization techniques. This is wasteful of sample and has an efficiency of typically about 2%. In addition, the entire sample is admitted to the detector volume (whether it is a graphite furnace for AAS or an Ar carrier gas for ICP-OES or ICP-MS) carrying with it the matrix constituents and potential interferences.

Vapour generation for sample introduction has enjoyed widespread use for some 40 years, serving to enhance detection limits, improve sensitivity, alleviate matrix and spectral interferences, and foster throughput when coupled to atomic spectroscopy (Sturgeon 2002; He 2007). By resorting to vapour generation, the efficiency can approach 100% with high selectivity for the analyte and thus reduced interferences, higher sensitivity and better limits of detection. However, conventional hydride and cold vapour generation, the most popular vapour generation techniques, are limited to semi-metals and mercury, respectively. Full advantage of the techniques cannot be realized because of the small scope of elements amenable to vapour generation.

Recently, the scope of elements amenable to chemical vapour generation (CVG) by reaction with sodium tetrahydroborate has expanded from the classical suite characterized by a limited number of elements comprising Groups 14-16 of the Periodic Table to include several transition and noble metals, engendered by the realization that rapid gas-liquid phase separation of the potentially unstable reaction products (Sturgeon 2002; Pohl 2007) not only permits their detection, but can significantly reduce the impact of matrix interferences on conventional hydride generation (HG) (Ding 1997; Tao 1999; Moor 2000). With these principles and goals in mind, a variety of approaches to CVG have followed suit, including use of a movable reduction bed generator (Tian 1998), a dual concentric pneumatic nebulizer for rapid mixing of reductant and sample (Moor 2000), a multi-mode sample introduction spray chamber (MSIS) incorporating ports for both nebulization and CVG capabilities (McLaughlin 2002), a direct hydride generation nebulizer for simultaneous introduction of reductant and sample (Rojas 2003), a dual port modified cyclonic spray chamber for similar purposes (Maldonado 2006), and a triple mode introduction system capable of CVG (Asfaw 2007).

Chemical vapor generation (CVG) is a widely adopted sample introduction method for analytical atomic spectrometry in which precursor compounds (usually ionic, metallic or organometallic species) can be transferred from the condensed phase to the gas phase, yielding the advantages of efficient matrix separation, high analyte transport efficiency, high selectivity, simple instrumentation, and ease of automation. Hydride generation enjoys the greatest popularity as a consequence of its ease of implementation, fast reaction and high yield.

Photochemical vapour generation (PVG), a newly emerging research field in analytical chemistry (He 2007; Guo 2003; Guo 2004b), may provide a powerful alternative to conventional CVG due to its simplicity, versatility and cost effectiveness. Although photocatalytic pre-reduction has been used for a number of years, the most attractive aspect of this newly emerging area is the direct generation of volatile species using photochemical reactions. Flow-through and batch reactors employing low molecular weight (LMW) organic acids as photochemical agents for such systems as mercury and selenium have been studied recently (He 2007).

However, there remains a need in the art for improved apparatuses and processes for vapour generation of an analyte from a sample, especially for photochemical vapour generation (PVG).

SUMMARY OF THE INVENTION

Therefore, in one aspect of the present invention there is provided a photochemical vapour generator comprising: a reaction chamber having a liquid sample inlet, a carrier gas inlet and a carrier gas outlet; a liquid sample support surface for supporting a film of a liquid sample in the reaction chamber; and, a source of ultraviolet radiation positioned in radiative contact with the liquid sample support surface.

In a second aspect of the present invention there is provided a process for detecting and/or quantifying an analyte comprising: providing a liquid film of a sample containing an organic acid or a salt thereof and a precursor compound of the analyte; exposing the liquid film to ultraviolet radiation to generate a volatile species of the analyte; separating the volatile species from the liquid film to form a vapour containing the volatile species; and, directing the vapour to a detector to detect and/or quantify the analyte in the vapour.

The photochemical vapour generator comprises a reaction chamber. The reaction chamber comprises a liquid sample inlet for introducing a liquid sample into the chamber, a carrier gas inlet for introducing carrier gas into the chamber and a carrier gas outlet for removing carrier gas and generated vapours from the chamber. The chamber also preferably comprises a liquid waste outlet for removing liquid waste from the chamber after the vapour is generated. The reaction chamber preferably comprises a material that is transparent to ultraviolet radiation, for example quartz. The reaction chamber is preferably in the form of a tube. The tube may have any suitable cross-sectional shape, for example circular, elliptical, square, rectangular, triangular, hexagonal or a combination thereof. Cylindrical tubes having a circular cross-section are preferred. An inner surface of the reaction chamber may be contoured to inhibit carrier gas from passing through any pooled liquids in order to minimize formation of aerosols.

The photochemical vapour generator also comprises a liquid sample support surface in the reaction chamber for supporting a film of a liquid sample. Liquid sample introduced into the reaction chamber contacts the liquid sample support surface and forms a thin film on the surface. Flow of the liquid sample along the liquid sample support surface facilitates creation of the thin film. The flow may be effected by any suitable means, for example, by gravity, by an active flow regulator (e.g. a pump), or by both. In a vertically-oriented embodiment, flow is preferably a result of gravity forcing the liquid sample down along the liquid sample support surface, where the liquid sample adheres to the liquid support surface through forces of adhesion. In a horizontally-oriented embodiment, flow is preferably a result of an active flow regulator. In an inclined embodiment, flow may be a result of gravity or both gravity and an active flow regulator.

The liquid sample support surface may be an inner surface of the reaction chamber, a surface of a liquid sample support element, or both. The liquid sample support element may be a structure positioned within the reaction chamber that receives liquid introduced through the liquid sample inlet. The liquid sample support element may be separate from or attached to the reaction chamber. The liquid sample support element preferably comprises a material that is transparent to ultraviolet radiation, for example quartz. In one embodiment, the liquid sample support element comprises a rod housed within the reaction chamber along which the liquid sample flows. The rod may have any suitable cross-sectional shape, for example circular, elliptical, square, rectangular, triangular, hexagonal or a combination thereof. Cylindrical rods having a circular cross-section are preferred. In one preferred embodiment, the liquid sample support element is a rod housed concentrically within a tubular reaction chamber. Rods are particularly useful in vertically-oriented embodiments of the generator where gravity is utilized to effect flow of the liquid sample. In another embodiment, the liquid sample support element comprises a tube or channel housed with the reaction chamber within which the liquid sample flows. Tubes or channels are particularly useful in horizontally-oriented embodiments of the generator where an active flow regulator is utilized to effect flow of the liquid sample.

The volume flow rate of liquid sample, and hence residence time in the ultraviolet (UV) radiation, is determined by the surface area of the liquid sample support surface as well as delivery rate of the liquid sample to the generator. The liquid sample support surface may be modified by forming one or more topographical features thereon to increase residence time of the liquid sample in the generator. Topographical features that increase the surface area of the liquid sample support surface may be utilized to impede flow of the liquid sample by causing the liquid sample to travel further on the liquid sample support surface. Topographical features that increase surface area include, for example, a threaded screw, a pattern of bumps, a pattern of depressions, a series of cups or rings that provide a cascade of flowing liquid, or combinations thereof. Topographical features that direct flow of liquid sample in a specific path, for example tubes or channels, may also be utilized to increase residence time of the liquid sample in the generator. Where gravity is utilized to effect flow of the liquid sample on the liquid sample support surface, it is particularly advantageous to utilize topographical features that increase surface area of the liquid sample support surface. Where an active flow regulator is utilized to effect flow of the liquid sample, it is particularly advantageous to utilize topographical features that direct flow of the liquid sample in a specific path, since liquid sample flow rate can be readily regulated by regulating delivery rate of the active flow regulator.

In one preferred configuration of the generator, the reaction chamber is oriented such that the liquid sample inlet is located proximal a first end of the chamber and a liquid waste outlet is located proximal a second end of the chamber. In such a configuration, liquid sample introduced into the chamber is able to flow by virtue of gravity (in a vertically-oriented configuration) or active flow control (in a horizontally-oriented configuration) along the liquid sample support surface towards the second end of the chamber, and liquid waste produced during vapour generation can be conveniently disposed of at the second end. Likewise, in such a configuration, the carrier gas inlet is preferably located proximal the second end and the carrier gas outlet located proximal the first end so that the carrier gas pressure can sweep generated vapour out the first end of the chamber away from the liquid waste and towards the detector. The second end of the chamber is preferably outfitted with a liquid waste guide element to direct liquid waste away from the carrier gas inlet and towards the liquid waste outlet. The guide element may be, for example, a channel, an inclined wall or other such structure.

The photochemical vapour generator also comprises a source of ultraviolet (UV) radiation. Preferably, the source of ultraviolet radiation is positioned outside the reaction chamber with the UV radiation being able to impinge on the thin film of liquid sample supported by the liquid sample support surface. Preferably, the UV source is of any geometry that efficiently illuminates the thin film of liquid sample. The source of ultraviolet (UV) radiation preferably surrounds the thin film to maximize radiation exposure. The source of ultraviolet (UV) radiation is preferably a UV lamp or a UV LED. The UV source is preferably a coil that surrounds the reaction chamber, or straight discharge tubes configured around the reaction chamber and running up and down a length of the reaction chamber. The liquid sample support element is preferably within the reaction chamber when such a support element is utilized.

The reaction chamber preferably comprises one or more caps to facilitate insertion and removal of the liquid sample support element and to seal the chamber. The one or more caps are preferably removable. The one or more caps may be fitted with O-rings to facilitate sealing of the chamber and/or to support the liquid sample support element within the chamber. In preferred embodiments, the various inlets and outlets may be located in the one or more caps. In a preferred embodiment, a cap comprising the liquid waste outlet and the carrier gas inlet also comprises an inclined inner surface to direct liquid waste to the liquid waste outlet. The one or more caps preferably comprise a photochemically inert material, for example polytetrafluoroethylene (PTFE).

Liquid sample is introduced into the chamber and on to the liquid sample support surface by any suitable means, preferably by means of a pump. Preferably, the liquid sample is neither nebulized nor aerosolized to minimize contaminants in the vapour generated by the photochemical reactions in the thin film of liquid sample. Liquid waste removal can be facilitated by any suitable means, for example a pump, which may be the same or different as the means for introducing the liquid sample.

A carrier gas stream is generally introduced into the reaction chamber under pressure to permit the carrier gas stream to strip generated volatile species from the thin film of liquid sample. The thin film facilitates rapid escape of any generated volatile species from the liquid phase. The gas stream along with volatile species is directed to the detector for detecting and/or quantifying analyte in the stream. Prior to reaching the detector, the gas stream may be directed to a gas-liquid separator to separate any residual liquids from the stream. The carrier gas is preferably inert, both chemically and to UV radiation. The carrier gas preferably comprises argon, helium or nitrogen, more preferably argon or helium.

The liquid sample comprises an organic acid or a salt thereof and a precursor compound of the analyte. The liquid sample is preferably an aqueous solution. The organic acid is one or more low molecular weight (LMW) organic acids. LMW organic acids are, for example, formic acid, acetic acid, propionic acid or a mixture thereof. Salts of such acids are preferably inorganic base addition salts, for example sodium salts, potassium salts or mixtures thereof. Concentration of the organic acid depends to some extent on the analyte of interest. Concentrations of organic acid in a range of about 5-90% (v/v) are preferred, more preferably about 5-50%.

The precursor compound of the analyte may be any that contains an analyte of interest. Precursor compounds are typically analyte-containing molecules that exist within a sample collected for which analysis of the presence and/or amount of the analyte is desired. Samples collected for analysis may be, for example, waste water, drinking water or environmental samples which may be liquids or solids that are processed post-collection to form aqueous solutions (e.g. acid digestion processing). Analytes are preferably elements from Groups 3-17 of the Periodic Table, preferably Groups 5-17 of the Periodic Table, more preferably Groups 8-17 of the Periodic Table. Preferably, analytes are metals or semi-metals. Preferably, the analyte is I, Se, Te, As, Sb, Bi, Hg, Co, Fe, Ni, Cu, Zn, Cd, Sn, Pb, Ge, P or S.

Volatile species of the analyte are generated by virtue of a photochemical reaction of the precursor compound mediated by organic acid. Volatile species of the analyte may be, for example, hydrides, carbonyl compounds, alkyl compounds or mixtures thereof. The volatile species depends on the particular precursor compound as well as the particular organic acid.

Detectors may be any suitable detector for detecting or quantifying the analyte of interest. Suitable detectors include, for example, ICP-OES, ICP-MS, glow discharge or atomic absorption devices frequently used for analytical atomic spectroscopy.

The present simple, yet efficient thin-film vapour generator and process are surprisingly effective for use with photochemical vapour generation for detection and/or quantification of an expanded suite of analytes, while being applicable to conventional cold vapour and hydridization reactions as well. Use of a thin-film exposed to a UV field is thought to mitigate the effects of extraneous absorption of source intensity as it penetrates the liquid medium, thereby delivering UV intensity with high efficiency, minimizing the need for enhanced irradiation times for the processing of coloured (absorbing) samples (Vieira 2007). Amalgamation of photochemical reactions with thin film generation and gas-liquid phase separation has now achieved the benefits of all of these principles in a single unit, providing a simple and effective way of enhancing generation of an expanded suite of elements.

Apart from the typical advantages which accrue with use of a conventional VG reactor, the thin-film photochemical vapour generator (TF-PVG) offers several unique additional features: (i) rapid and very efficient separation of the reaction products is achieved due to the large surface-to-volume ratio provided by the thin liquid film; (ii) production of sample aerosol is minimized permitting a cleaner sample matrix to be admitted to the detector; (iii) interferences from concomitant elements and potential decomposition of the products by UV is significantly reduced because of the extremely rapid phase separation and analyte transport; (iv) flexible UV irradiation time can be achieved, providing a more universal application; (v) reaction efficiency is optimized as the UV efficiently penetrates the thin liquid film; and (vi) nanomaterials (e.g. $TiO_2$) can be conveniently coated onto the sample support element to provide a significant enhancement in PVG efficiency for certain elements, e.g. Se(VI) and Te(VI).

The generator and process of the present invention can provide sensitivity enhancements of about 1.3-fold or greater, for example, about 1.3-fold to about 275-fold. Further, detection limit enhancements may be about 2.7-fold or greater, for example about 2.7-fold to about 300-fold. Vapour generation efficiencies may be in a range of from 2-100%, and for most analytes exceed about 20%.

Moreover, the design of the TF-PVG permits its operation as a conventional CVG reactor wherein sodium tetrahydroborate can be used as a reductant, providing advantages of rapid washout and efficient generation and separation of analyte vapor. The use of this technique in combination with hydride generation (HG) may broaden the scope of detectable elements by CVG, with enhanced detection power, minimal interferences and potential speciation analysis.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Reagents and Solutions

High purity 18 MΩ-cm deionized water was generated using a mixed bed ion-exchange system supplied with reverse osmosis feedstock (NanoPure, model D4744, Barstead/Thermoline, Dubuque, Iowa) and used for preparation of all solutions.

Stock solutions (1000 mg mL$^{-1}$) of As(III), Sb(III), Bi(III), Se(IV), Te(IV), Hg(II), Ni(II), Fe(III) and Co(II) were obtained from SCP science (Montreal, PQ, Canada). A 1000 mg stock solution of Fe(II) was prepared from dissolution of high purity iron powder with sub-boiling distilled hydrochloric acid and dilution in boiled, degassed deionized water. The stock solution of I(I) (1000 mg mL$^{-1}$) was prepared by dissolving high-purity KI (Sigma-Aldrich) in boiled, degassed deionized water. Both solutions were stored in screw-capped polypropylene bottles securely sealed with PTFE tape in an effort to minimize any oxidation.

Reagent acids, including HCl, $HNO_3$, $H_2SO_4$ and low molecular weight (LMW) organic acids, including formic (88%, GFS, Canada) and acetic acid (6.3 M, BDH), were purified in-house prior to use by sub-boiling distillation of the reagent grade feedstocks in a quartz still. Working standards of lower concentration were prepared daily by dilution of the stocks using deionized water. Environmental grade ammonia (20-22%, v/v) from Anachemia Science (Montreal, PQ, Canada) was used to adjust the pH of the Fe solutions as required. High purity Ar was obtained from Praxair Products Inc. (Mississauga, ON, Canada).

National Research Council Canada Certified Reference Materials DORM-3 (Fish Protein) and DOLT-4 (Dogfish Liver Tissue) were used to validate the accuracy of the methodology.

Example 1

Thin-Film Photochemical Vapour Generator

Figure 1:
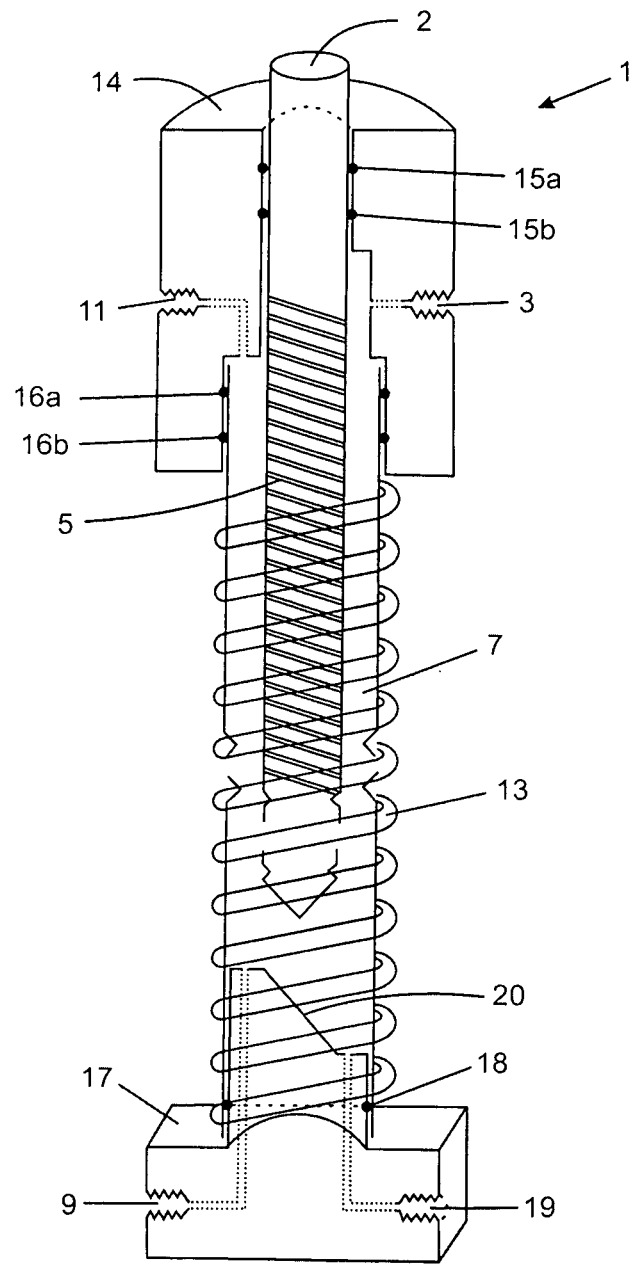
FIG. 1 is a schematic drawing of a first embodiment of a thin-film photochemical vapour generator (TF-PVG) of the present invention.

FIG. 1 provides a schematic drawing of a first embodiment of a thin-film photochemical vapour generator of the present invention in vertical orientation. With reference to FIG. 1, the thin-film photochemical vapour generator 1 integrates both vapour generation and gas-liquid separation functions utilizing a 6 mm o.d. vertical central quartz rod 2 onto which a liquid sample containing a precursor compound of an analyte is pumped through sample inlet 3 to yield a thin liquid film on the surface of the rod. The surface of the rod is fashioned into a screw design 5 to increase surface area of the rod in order to perturb what would otherwise be an unencumbered flow of liquid down a smooth surface under the influence of gravity, thereby enhancing sample residence time in the generator. The thin liquid flow facilitates rapid escape of any generated volatile species from the condensed phase. The rod is housed within a concentric 13 mm o.d. quartz tube 7. A flow of argon carrier gas is passed from gas inlet 9 through the quartz tube to strip and transport the generated volatile species to gas outlet 11 and thence to a detector where the presence of the analyte in the gas flow is detected.

Concentric quartz tube 7 is itself surrounded by a 78-turn 0.5 m long quartz coil low pressure mercury discharge lamp 13 operating at 20 W. The coil lamp was custom fabricated by Jelight Co. (Irvine Calif.). The top of the generator is fitted with a first poly(tetrafluoroethylene) (PTFE) cap 14 which supports rod 2 via a series of gas-tight "O"-rings 15a,15b, and which also supports concentric quartz tube 7 via a series of gas-tight "O"-rings 16a,16b. First cap 14 is provided with sample inlet 3 as well as gas outlet 11. In a similar fashion, the bottom of the device is closed with a second PTFE cap 17 containing gas inlet 9 and liquid waste outlet 19, and sealed with gas-tight "O"-ring 18. Second cap 17 comprises inclined wall 20 to facilitate draining of liquid waste through outlet 19 while preventing liquid waste from entering gas inlet 9. A contoured interior surface of the concentric quartz tube also helps prevents the Ar gas from passing through any pooled liquid phase thereby reducing aerosol production. The lower tip of central quartz rod 2 terminates approximately 2 cm from the surface of the second cap.

Figure 2:
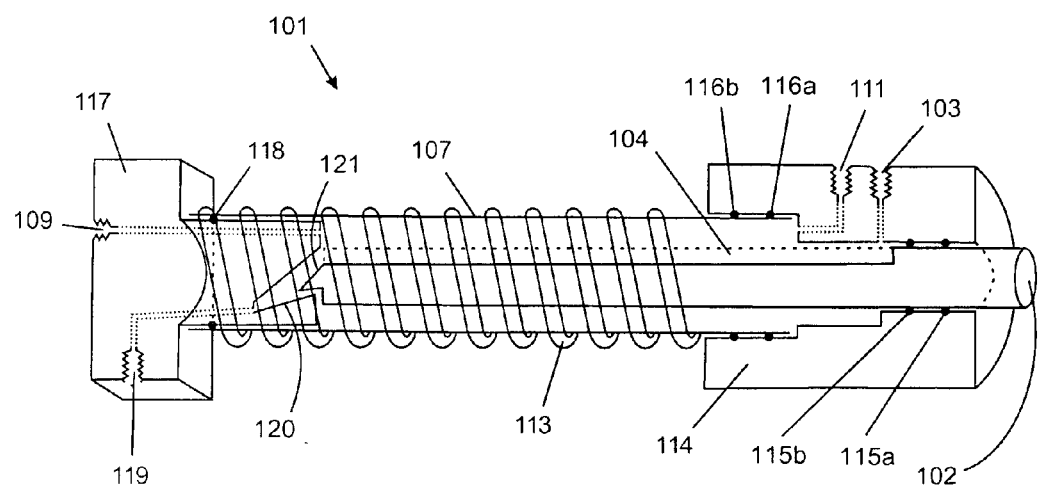
FIG. 2 is a schematic drawing of a second embodiment of a thin-film photochemical vapour generator (TF-PVG) of the present invention.

FIG. 2 provides a schematic drawing of a second embodiment of a thin-film photochemical vapour generator of the present invention in horizontal orientation. With reference to FIG. 2, the thin-film photochemical vapour generator 101 integrates both vapour generation and gas-liquid separation functions utilizing a 6 mm o.d. horizontal quartz sample support element 102 having channel 104 grooved therein into which a liquid sample containing a precursor compound of an analyte is pumped through sample inlet 103 to yield a thin liquid film on the inner surface of the channel. Flow rate of the liquid sample through the sample inlet is regulated to enhance sample residence time in the generator. The thin liquid flow facilitates rapid escape of any generated volatile species from the condensed phase. The channel is housed within a concentric 13 mm o.d. quartz tube 107. A flow of argon carrier gas is passed from gas inlet 109 through the quartz tube to strip and transport the generated volatile species to gas outlet 111 and thence to a detector where the presence of the analyte in the gas flow is detected.

Concentric quartz tube 107 is itself surrounded by a 78-turn 0.5 m long quartz coil low pressure mercury discharge lamp 113 operating at 20 W. One end of the generator is fitted with a first poly(tetrafluoroethylene) (PTFE) cap 114 which supports sample support element 102 via a series of gas-tight "O"-rings 115a,115b, and which also supports concentric quartz tube 107 via a series of gas-tight "O"-rings 116a,116b. First cap 114 is provided with sample inlet 103 as well as gas outlet 111. In a similar fashion, the other end of the device is closed with a second PTFE cap 117 containing gas inlet 109 and liquid waste outlet 119, and sealed with gas-tight "O"-ring 118. Second cap 117 comprises inclined wall 120 to facilitate draining of liquid waste through liquid waste outlet 119 while preventing liquid waste from entering gas inlet 109. A contoured interior surface of the concentric quartz tube also helps prevents the Ar gas from passing through any pooled liquid phase thereby reducing aerosol production. Tip 121 of quartz sample support element 102 terminates approximately 1 cm from the surface of the second cap and is inclined toward inclined wall 120 to facilitate draining of liquid waste from channel 104 into liquid waste outlet 119.

Figure 3:
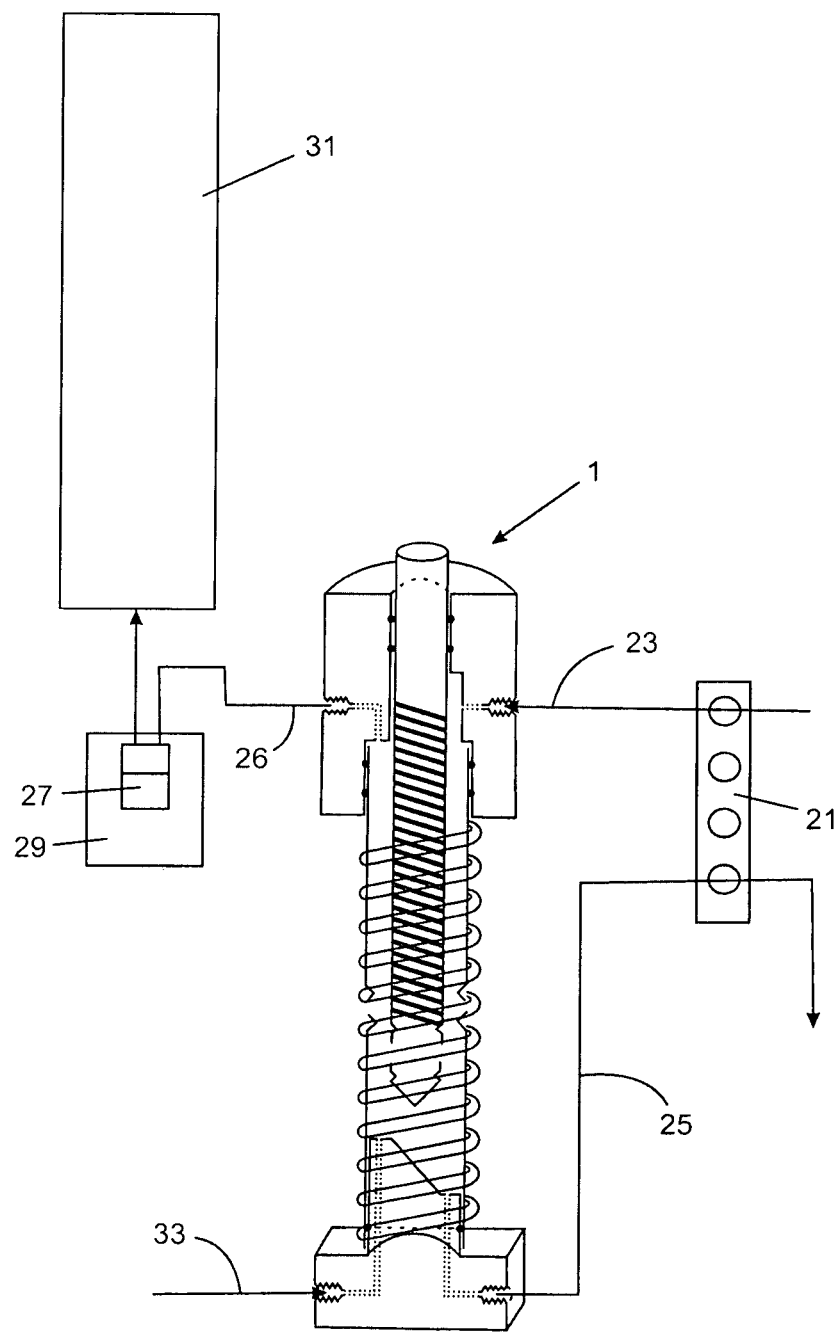
FIG. 3 is a schematic drawing of the thin-film photochemical vapour generator of FIG. 1 depicted in association with an ICP-OES detector and a pump.

FIG. 3 illustrates how the thin-film photochemical vapour generator of FIG. 1 is utilized in association with an ICP-OES detector. A similar configuration can be utilized with the TF-PVG of FIG. 2. Referring to FIG. 3, generator 1 is housed in a large outer glass tube (not shown) through which a flow of nitrogen or argon is passed to eliminate oxygen and avoid ozone generation. The outer glass tube is wrapped with aluminum foil to reflect UV radiation from the lamp and to protect the operator. A four channel minipuls 2 peristaltic pump 21 (Gilson, Middleton, Wis.) is used to transport samples to the generator through line 23 and to evacuate the liquid waste from the bottom of the generator through line 25. Generated volatile species are separated within the generator and directed through line 26 to a separate in-line small (10 mL internal volume) gas-liquid separator (GLS) 27 whose waste outlet is sealed. The GLS is immersed in ice bath 29 to minimize water vapour carryover and to ensure no condensed liquid droplets are transported to ICP 31. The mass flow controlled Ar nebulizer gas from the ICP-OES serves as the carrier gas, which is carried to the generator through line 33. The outlet of the GLS was connected to the ICP torch via a 75 cm length of PTFE tubing (2.5 mm i.d.×4.0 mm o.d).

In the examples below, an inductively coupled argon plasma optical emission spectrometer (ICP-OES) serves as the detector (Perkin-Elmer Optima 3000 radial view ICP-OES instrument). Operating parameters of the ICP-OES are summarized in Table 1 and compared with parameters for normal liquid nebulization.

TABLE 1

Operating Parameters for ICP-OES

| | UV-PVG | Normal liquid nebulization |
|---|---|---|
| Ar flow rates (L min$^{-1}$) | | |
| Plasma | 15 | 15 |
| Auxiliary | 0.5 | 0.5 |
| Nebulizer | 0.7 | 0.8 |
| RF power (W) | 1250 | 1250 |
| Sample flow rate (mL min$^{-1}$) | 2.3 (As, Sb, Bi, Se, Te, Co) 1.9 (Ni) 2.9 (I, Hg) 0.2 (Fe) | |
| Viewing height (mm) | 15 | 15 |

Example 2

Sample Analysis Using TF-PVG

Procedure

Once the Ar plasma and the UV lamp of the TF-PVG of Example 1 are stabilized, the PVG generator is brought on-line and volatile species are generated when analyte standard solutions containing formic or acetic acid at varying concentrations are delivered to the TF-PVG. Gaseous products, simultaneously separated from the liquid phase within the generator, are flushed by the Ar carrier gas to the ICP torch for optical emission measurements. All experimental conditions are optimized for maximum response for each analyte. A blank is measured before each run using solutions containing only sub-boiling distilled LMW acids (ammonia and the LMW organic acid in the case of iron). No blank signal is generally detected; however, it is noteworthy that analytical grade formic acid produces a very high blank for iron and nickel before purification.

Test samples of nominal 0.25 g of CRMs DORM-3 and DOLT-4 are weighed into Teflon™ digestion vessels (CEM ACV type) and 7 ml of nitric acid and 200 μl (30%) hydrogen peroxide added. The vessels are capped, and the samples digested using a Model MDS-2100 microwave digestion system (CEM Corp.). The digested samples are cooled and reconstituted to a final volume of 25 ml final volume using DIW and stored in pre-cleaned polyethylene screw-capped bottles.

Safety Considerations $Ni(CO)_4$ and $Fe(CO)_5$ are extremely toxic, and additional unknown gaseous products may be generated during exposure of the tested solutions to UV irradiation. Essential safety considerations must be taken during all manipulations and an adequate ventilation/exhaust system must be used.

Optimization of Instrumental Parameters

Optimization of ICP-OES plasma and auxiliary gas flow rates as well as rf power for the resultant "dry" plasma conditions are quickly performed by monitoring analyte intensities while supplying 100 ng L$^{-1}$ solutions of each analyte element to the TF-PVG. Values of 15 L min$^{-1}$, 0.5 L min$^{-1}$ and 1250 W for these parameters were selected as overall compromise conditions.

Figure 4A:
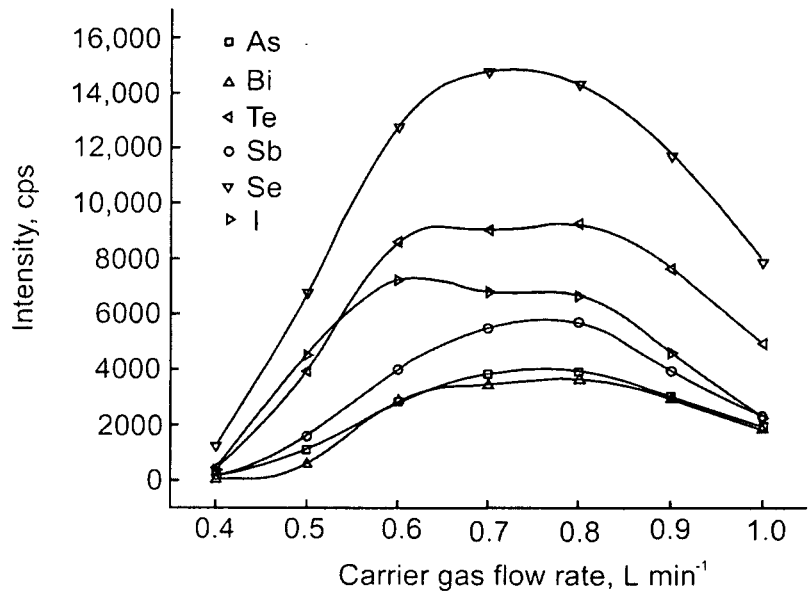
FIGS. 4a and 4b depict graphs showing effect of carrier gas flow rate on responses from 100 ng mL$^{-1}$ solutions of As, Sb, Bi, Se, Te, Hg, Fe, Co, and Ni, and a 1000 ng mL$^{-1}$ solution of I.
Figure 4B:
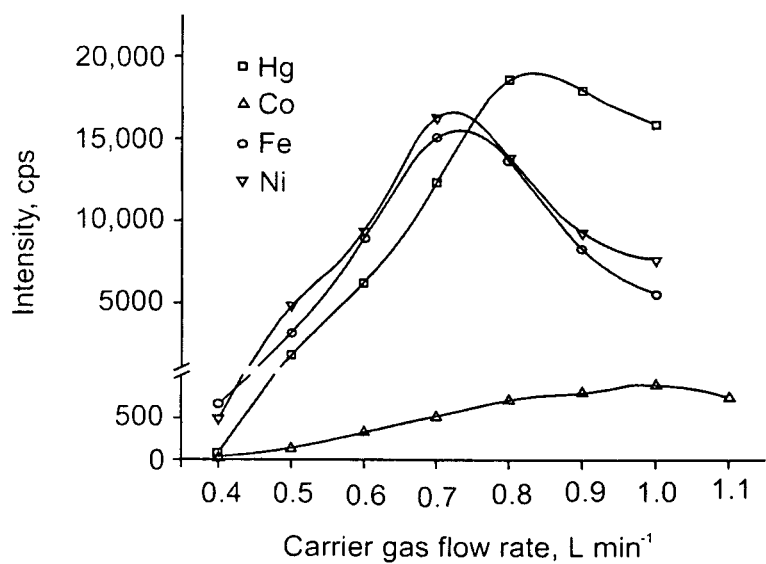

Carrier gas flow rate (surrogate for the nebulizer gas in this configuration) through the TF-PVG-GLS system significantly affected response as it influenced analyte concentration in the carrier gas, analyte transport efficiency as well as analyte residence time in the plasma (hence atomization/excitation efficiency), as shown in FIGS. 4a and 4b. Efficient gas-liquid separation and quantitative transport of the volatile species to the plasma could not be achieved using carrier gas flow rates lower than 0.45 L min$^{-1}$. A response plateau was obtained for all elements except iodine in the range 0.70 to 0.80 L min$^{-1}$ which likely reflects a simple balance between dilution of analyte with excess Ar flow and increased transport of the hydrophobic analyte from the liquid phase due to the concentration gradient; higher argon flow rates caused significant dilution effects and decreased response.

No loss of signal was encountered when up to a 5-m length of PTFE transfer tubing was used to connect the GLS to the ICP, facilitating the hyphenation and suggesting that the volatile products arising from these analyte elements are very stable.

Effect of LWM Organic Acids

Figure 5A:
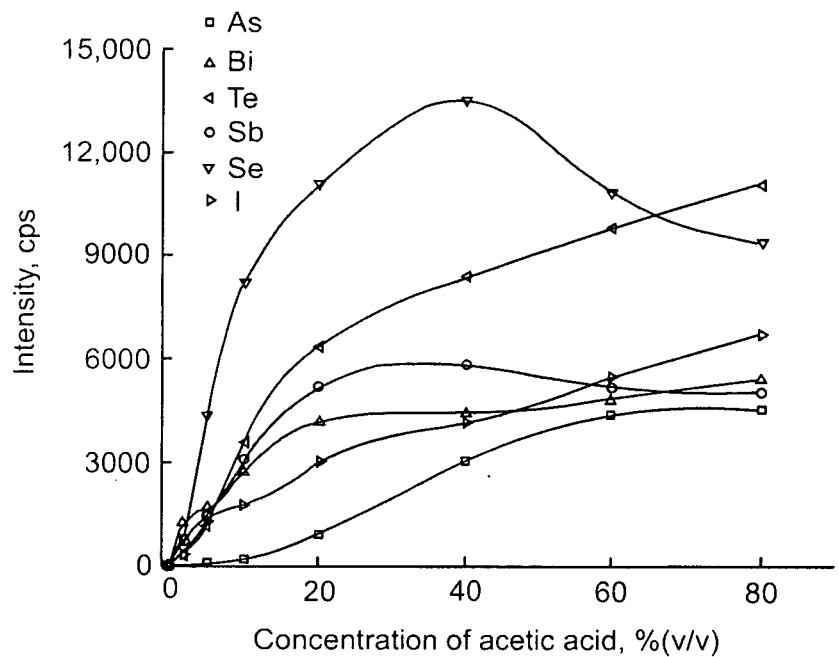
FIG. 5 depicts graphs showing effect of (a) acetic and (b) formic acid concentration on responses from 100 ng mL$^{-1}$ As, Sb, Bi, Se, Te, Hg, Fe, Co, and Ni, and 1000 ng mL$^{-1}$ I.
Figure 5B:
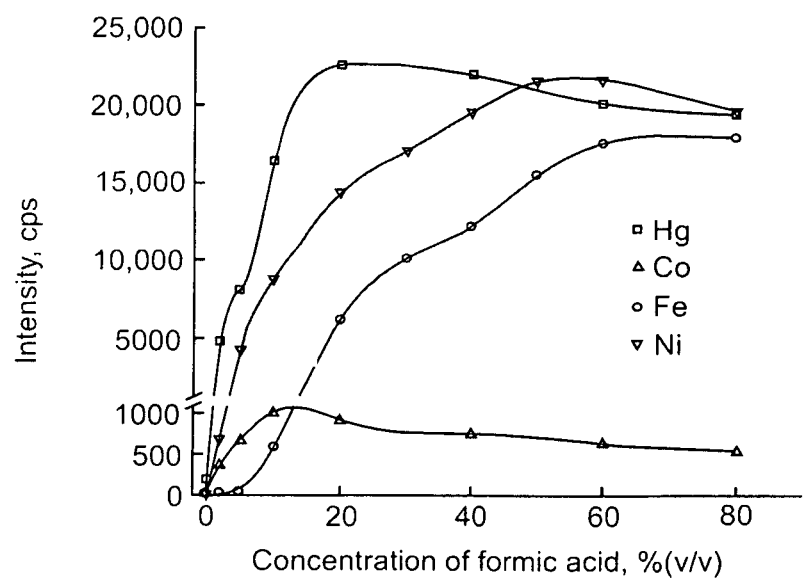

Of the variety of possible low molecular weight organic acids typically used to elicit PVG, only formic and acetic acids were examined in detail in this study, although other LMW organic acids are expected to have utility as well. In agreement with earlier reports, the PVG efficiencies were strongly dependent on the type and the concentrations of organic reducing reagent as well as the analyte element. Compared to formic acid, acetic acid is more favourable for the PVG of hydride-forming elements and iodine. No signals could be detected for Bi and I when generation was attempted with formic acid. The effects of acetic acid concentration on the intensity of atomic emission for a solution containing 100 ng mL$^{-1}$ As(III), Sb(III), Bi(III), Se(IV), Te(IV) and 1000 ng mL$^{-1}$ I(I) are shown in FIG. 5a. Intensities for all elements increased with increasing concentration of acetic acid in the range of 0%-40% (v/v). For the purpose of achieving simultaneous determination of these elements, 50% (v/v) acetic acid was used for subsequent experiments. In contrast to the acetic acid system, the formic acid system is more convenient for the generation of volatile Fe, Co and Ni species. FIG. 5b shows that response for cobalt can be detected at acid concentrations as low as 2% (v/v). However, the optimum concentration of formic acid is more than 50% (v/v) for Fe and Ni and no response is achieved for Fe below 20%. PVG of Hg is very efficient with optimum response achieved at concentrations below 10% (v/v) of either formic or acetic acid.

Effect of Sample pH

Results generated with the present system are similar to those reported earlier wherein generation efficiencies for transition metals are largely determined by the pH of the sample solution. For trace and ultra-trace elemental analysis, many analytical grade solid reagents such as formate, acetate and phosphate cannot be used to adjust the pH of a solution because they contain high levels of transition metal impurities. For this study, environmental grade ammonia containing <10 ng L$^{-1}$ transition metal impurities was used to adjust the pH of the sample solution prior to PVG. No signals from hydride-forming elements were detected when the pH of the solution was higher than 5. Although a similar response for each of As, Sb, Bi, Se and Te could be obtained in the pH range 0 to about 5, this was completely different from that of each of the transition elements which required an optimum pH range for PVG. At pH less than 0 or higher than 4, almost no response was obtained for Fe but a more than 40-fold enhancement could be achieved when using ammonia to adjust the pH to the range of 2.5 to 3.0 in the presence of 50% (v/v) formic acid. Based on the well-known fact that CO reacts with metallic Ni to form gaseous $Ni(CO)_4$, one may predict that the mechanism for PVG of transition metal species may involve an initial reduction of the analyte ion to free atoms in solution concurrently with the generation of and attack by organic radicals. The resultant volatile species then transfers to the gas phase. If the reaction is too acidic, redissolution of the transition metal may immediately occur or a metal hydroxide may form when the solution is too basic.

Influence of Sample Flow Rate

Response from all elements was achieved only in the presence of the UV source, as neither volatile species nor any aerosol containing the sample was transported to the ICP in its absence. For many elements, response ceases immediately after the UV lamp is turned off. Radical generation will halt immediately as the UV field is removed and any lingering signal arises because of the finite washout time of the generator-GLS system convoluted with the finite phase transfer of the volatile species to the Ar carrier gas. Volatile species of some of the tested elements, such as Hg and I, can be generated within less then 5 s irradiation time whereas tens of seconds are required for the hydride-forming elements and that for the transition metals can take several minutes.

Figure 6A:
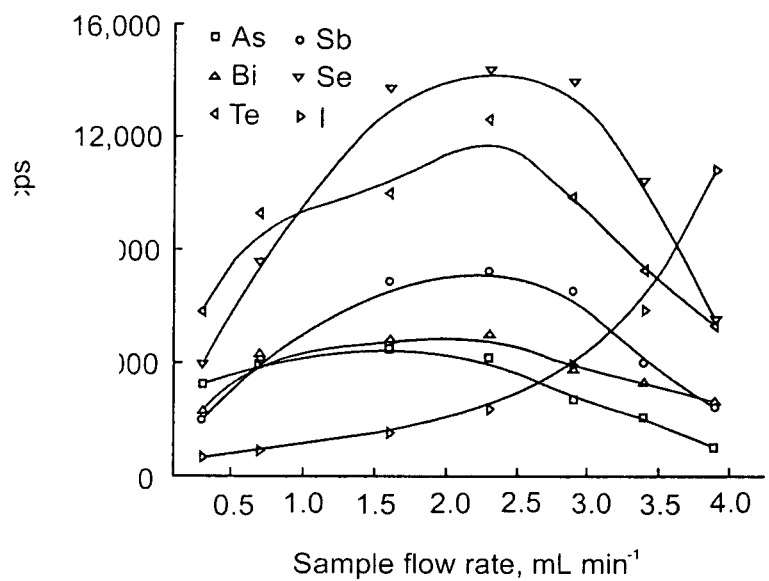
FIGS. 6a and 6b depict graphs showing effect of sample flow rate on responses from 100 ng mL$^{-1}$ As, Sb, Bi, Se, Te, Hg, Fe, and Ni, and 1000 ng mL$^{-1}$ I; and, FIG. 7 depicts a graph showing steady-state responses from 500 ng mL$^{-1}$ Hg, Fe, Ni, As and Se under optimum experimental conditions.
Figure 6B:
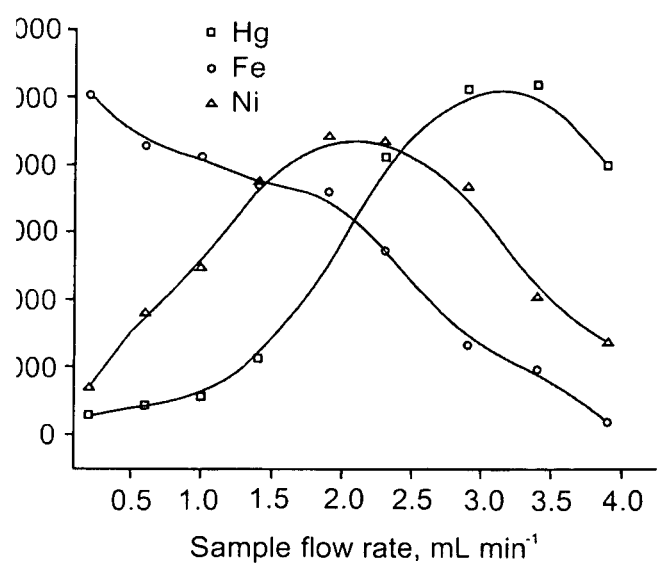

Ideally, analyte response should increase linearly with sample introduction flow rate until saturation occurs due to plasma processes or detector function. However, the multiple processes that sequentially occur in the PVG are all kinetically controlled and the slowest step in the sequence will determine the overall rate and thus the impact of the sample introduction rate on response. Thus, for a continuous mode of sample introduction the response curve is expected to exhibit an optimum, determined at low flow rates by the flux of sample to the reactor and at high flow rates by the residence time of the solution in the UV field which will influence the extent of the reaction as well as the efficiency of the phase separation. Lengthening the central quartz rod or altering its surface topology can be used to extend the irradiation time for a given sample flow rate. To provide sufficient irradiation time, especially for transition metals, the longest central quartz rod possible with the current design was used (58 cm) and its surface was modified by adding a threaded topology. The effect of sample flow rate on response is shown in FIGS. 6a and 6b. Signals for hydride-forming elements increased with sample flow rate in the range 0.2 to 2.3 mL min$^{-1}$, reaching an optimum at about 2.3 mL min$^{-1}$, corresponding to an irradiation time of 15 s. In this region the increased sample flux is the main factor determining response. Beyond 2.3 mL min$^{-1}$ signals decreased due to insufficient irradiation time. As Hg and I are readily converted to their volatile species, less than 10 s irradiation time is sufficient, permitting flow rates up to 3.5 mL min min$^{-1}$ for Hg and higher for I. However, for Fe, no optimum irradiation time could be achieved and even 150 s (the longest available with this system) appears insufficient.

Generation Efficiency

One method used to estimate the overall PVG efficiencies uses the ratio of their signals (AAS or AFS) to that arising from conventional HG based on the NaBH$_4$-acid hydride generation system under optimized conditions (Guo 2004a). This assumes that the efficiency of the latter is 100%. Unfortunately, such an approach could not be used in this study as it is too difficult to generate hydrides of Fe, Co, Ni and I using the NaBH$_4$-acid system. Consequently, the PVG efficiencies were estimated from an assessment of the relative concentrations of analyte in the feed and remaining in the waste solution after the sample was subjected to PVG. Based on such data, overall generation efficiencies achieved under optimum conditions are summarized in Table 2.

TABLE 2

TF-PVG Efficiencies

| Element | Organic acid | Efficiency, % | Element | Organic acid | Efficiency, % |
|---|---|---|---|---|---|
| As(III) | CH$_3$COOH | ~49 | Fe(II) | HCOOH | ~60 |
| Sb(III) | CH$_3$COOH | ~58 | Co(II) | HCOOH | ~2 |
| Bi(III) | CH$_3$COOH | ~61 | Ni(II) | HCOOH | ~65 |
| Se(IV) | CH$_3$COOH | ~75 | Hg(II) | HCOOH | ~100 |
| Te(IV) | CH$_3$COOH | ~68 | I(I) | CH$_3$COOH | ~20 |

Efficiencies for As(III), Sb(III), Bi(III), Se(IV), Te(IV), Fe(III), Ni(II) and I(I) using the TF-PVG are typically found to be more than 3-fold greater than those reported with other PVG devices (Grinberg 2009; Zheng 2009a; Zheng 2009b). The PVG efficiency obtained for mercury in this study is not different from that reported for earlier systems (Zheng 2005), probably because it can be readily reduced to its cold vapor in various CVG reactors. Other factors also come into play, as for example when it is noted that Yin et al. (Yin 2008) reported that mercury can be reoxidized by UV irradiation when long exposure times are used for the PVG, resulting in decreased generation efficiency. Additionally, Feng et al. (Feng 2003) demonstrated that many such generated species are soluble and stable in water, with the result that the PVG efficiencies of the overall measurement process ($\epsilon_{CVG}$) are determined by the efficiencies of formation ($\epsilon_{for}$), separation ($\epsilon_{sep}$), transport ($\epsilon_{tra}$) and photo-decomposition ($\epsilon_{dec}$) of the analyte, i.e., $$\epsilon_{CVG}=\epsilon_{for}\epsilon_{sep}\epsilon_{tra}(1-\epsilon_{dec}) \quad (1)$$

The design features of the TF-PVG are such as to optimize the efficiencies for generation, separation and transport in that a thin film serves to maximize UV intensity throughout the sample while promoting rapid phase separation into an efficient small dead volume transport system. The remaining drawback associated with the finite size of the current system may possibly be circumvented by increasing the lamp power so as to reduce the irradiation time for elements such as Fe.

The efficiencies estimated using the above technique are consistent with the enhanced signal intensities arising from PVG sample introduction as opposed to conventional solution nebulization wherein a sample introduction efficiency of typically 2% can be assumed.

Figures of Merit

Analytical figures of merit for As, Sb, Bi, Te, Fe, Ni, Co and I were evaluated under optimal experimental conditions. The linear correlation coefficients for calibration curves were better than 0.99 at the trace concentration level and began to deviate from linearity at concentrations >5 mg L$^{-1}$ due to the decreased PVG efficiencies at higher concentrations. Such a phenomenon has been reported earlier with the formation of an amorphous Se(0) precipitate deposited onto the inner surfaces of a photo-reactor when high concentrations of selenium (100 mg L$^{-1}$) were photolysed (Guo 2003). This may arise because of the high transient concentrations of reduced Se atoms promote collisional flocculation before radical attack can produce a stable volatile species. It is clear that optimal application of this technique will lay with the analysis of these elements at trace concentration levels. Table 3 summarizes the sensitivities and limits of detection achieved with the TF-PVG for sample introduction as compared to those arising from conventional solution nebulization obtained using the manufacturer's suggested conditions.

Significant improvements are notable: 108-, 117-, 127-, 251-, 124-, 231-, 77-, 1.3-, 16 and 31-fold enhancements in sensitivity (slope of calibration curve) were obtained for As, Sb, Bi, Se, Te, Hg, Ni, Co, Fe and I, respectively. These enhancements may be accounted for in part by the increased sample flow rates used with PVG, i.e., 2.3 mL min$^{-1}$ for As, Sb, Bi, Se and Te, 2.9 mL min$^{-1}$ for Hg and I and 1.9 ml min$^{-1}$ for Ni and Co as opposed to the 1.5 mL min$^{-1}$ used for solution nebulization (note that, in contrast, a PVG flow rate of only 0.2 ml min$^{-1}$ was used for Fe). Additionally, the drier plasma arising from PVG sample introduction should provide an improved environment for enhanced analyte emission as a consequence of higher local plasma excitation temperature.

TABLE 3

Figures of Merit

| Element | TF-PVG-ICP-OES | Conventional ICP-OES | Improvement factor |
|---|---|---|---|
| Sensitivity, cps/mg L$^{-1}$ | | | |
| As | 650 | 70400 | 108 |
| Sb | 660 | 76900 | 117 |
| Bi | 520 | 66400 | 127 |
| Se | 770 | 193100 | 251 |
| Te | 1060 | 131100 | 124 |
| Fe | 12000 | 188440 | 16 |
| Co | 7140 | 9485 | 1.3 |
| Ni | 3320 | 255640 | 77 |
| Hg | 1230 | 284110 | 231 |
| I | 245 | 7595 | 31 |
| LOD, µg L$^{-1}$ | | | |
| As | 0.14 | 16 | 114 |
| Sb | 0.23 | 33 | 143 |
| Bi | 0.27 | 46 | 170 |
| Se | 0.09 | 24 | 266 |
| Te | 0.10 | 20 | 200 |
| Fe | 0.06 | 3 | 50 |
| Co | 1.7 | 4.6 | 2.7 |
| Ni | 0.06 | 9.3 | 155 |
| Hg | 0.10 | 30 | 300 |
| I | 1.1 | 48 | 44 |

Figure 7:
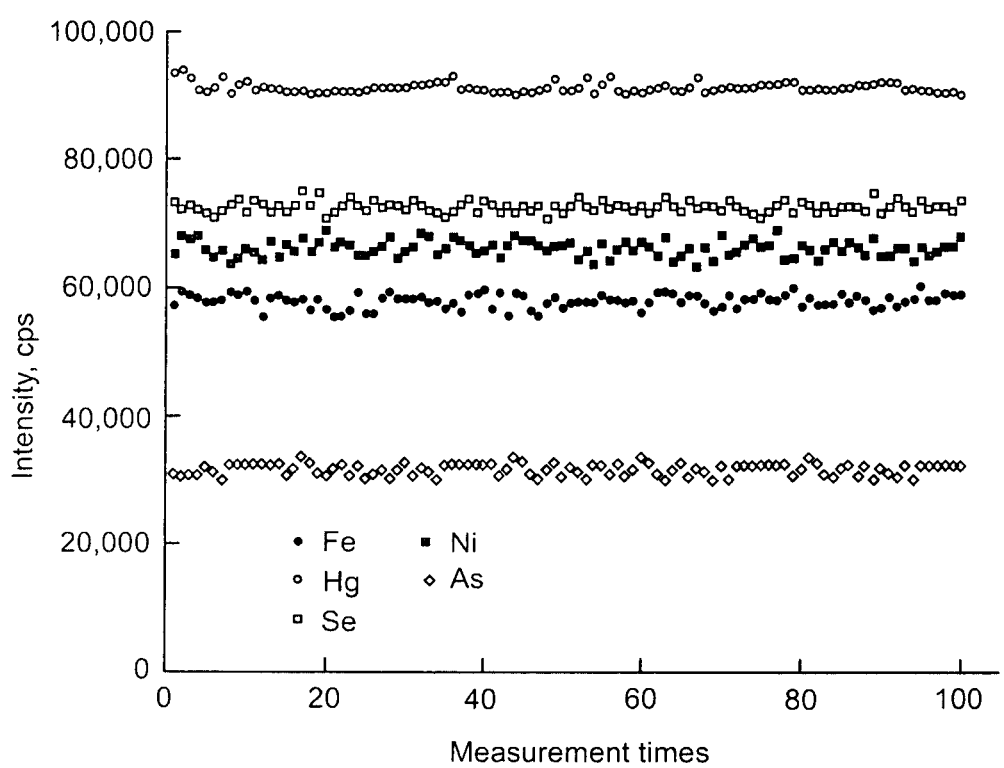

The LOD, defined as the analyte concentration equivalent to 3 s of 11 repeat measurements of a blank solution, was improved 114-, 143-, 170-, 266-, 200-, 300-, 155-, 2.7-, 50- and 44-fold for As, Sb, Bi, Se, Te, Hg, Ni, Co, Fe and I, respectively compared to those arising from conventional solution nebulization. The LOD and sensitivity may potentially be further improved if a longer generator was used to increase sample radiation time or a higher power lamp was applied since no significant blank arises with use of high-purity reagents. Conventional CVG processes based on the NaBH$_4$-acid reductant system generates significant hydrogen, evolved in the form of bubbles, which perturbs plasma detection systems not only because it is difficult to sustain the plasma in the presence of excess hydrogen, but the bubbles enhance the noise and degrade precision. The nature of the PVG process and the smooth and continuous phase separation available with the TF-PVG preclude these problems, leading to lower RSDs and enhanced LODs. FIG. 7 illustrates steady-state signals obtained for a number of analytes using the TF-PVG, yielding precisions of less 0.5% RSD (based on 11 measurements).

Analysis of Reference Materials

The accuracy of the proposed methodology was validated by the determination of two representative elements, Fe and Ni, in DORM-3 (Fish Protein) and DOLT-4 (Dogfish Liver Tissue). Direct analysis of these analytes in the digested samples was not possible because of serious interferences arising from the high concentration of residual nitric acid and thus an evaporation step was undertaken to remove it. For the determination of Fe in these two samples, 1 mL of the digested sample was evaporated to near dryness on a hot plate under a clean hood and then diluted to 25 mL using 50% formic acid. Ammonia was used to adjust the pH to 2.5-3. Due to the low level of Ni$^{2+}$ present in the samples, 10 mL volumes of digest were evaporated to near dryness and then diluted to 5 mL using 50% formic acid. Analytical results are summarized in Table 4. It is clear that the proposed TF-PVG is capable of generating accurate and precise results for these elements in real samples when calibration is performed using external standards.

TABLE 4

Determination of Fe and Ni in Certified Reference Materials

| | Determined[a], mg/kg | Certified, mg/kg |
|---|---|---|
| DORM-3 | | |
| Fe | 362 ± 20 | 347 ± 20 |
| Ni | 1.33 ± 0.17 | 1.28 ± 0.24 |
| DOLT-4 | | |
| Fe | 1823 ± 35 | 1833 ± 75 |
| Ni | 1.01 ± 0.15 | 0.97 ± 0.11 |

[a]mean and standard deviation (n = 3)

It is now well appreciated that detection of volatile transition and noble metal species following hydride generation, as well as reduction in potential interferences arising from transition and noble elements, can be achieved under conditions facilitating rapid gas-liquid phase separation of the product (Ding 1997; Tao 1999). Earlier studies have reported that optimum irradiation times for UV-PVG are dependent on the LWM acid and the analyte element: I, Co and Hg are easily reduced to their volatile species within 5 seconds (Zheng 2005; Grinberg 2008; Grinberg 2009). However, vapour generation of Se or Ni requires some 60 s of irradiation time (Guo 2004a; Zheng 2009a), whereas up to 250 s is needed for PVG of iron. A universal PVG generator as described herein which incorporates both vapour generation and gas-liquid separation functions accommodates these varied requirements.

Thus, in the present examples, a novel TF-PVG was coupled with ICP-OES to demonstrate its successful application to the generation of volatile species of the classical hydride-forming elements, Hg, several transition metals and non-metals. Compared to conventional PVG, the present thin-film device significantly improves sensitivities, precision and LODs due to its inherent advantageous features which include a large reaction surface area to promote photogeneration as well as efficient phase separation of the products and flexible irradiation time. LODs could be further enhanced by several orders of magnitude by coupling the generator to ICP-MS instrumentation or in situ trapping electrothermal atomic spectrometry.

REFERENCES

The contents of the entirety of each of which are incorporated by this reference.

Asfaw A, Wibetoe G. (2007) *J. Anal. At. Spectrom.* 22, 158-163.
Ding W W, Sturgeon R E. (1997) *Anal. Chem.* 69, 527-531.
Feng Y L, Sturgeon R E, Lam J W. (2003) *Anal. Chem.* 75, 635-640.
Grinberg P, Mester Z, Sturgeon R E, Ferretti A. (2008) *J. Anal. At. Spectrom.*, 23, 583-587.
Grinberg P, Sturgeon R E. (2009) *J. Anal. At. Spectrom.* 24, 508-514.

Guo X-M, Sturgeon R E, Mester Z, Gardner G J. (2003) *Environ. Sci. Technol.* 37, 5645-5650.
Guo X-M, Sturgeon R E, Mester Z, Gardner G J. (2004a) *Anal. Chem.* 75, 2092-2099.
Guo X-M, Sturgeon R E, Mester Z, Gardner G J. (2004b) *Anal. Chem.* 76, 2401-2405.
He Y, Hou X, Zheng C, Sturgeon R E. (2007) *Anal. Bioanal. Chem.* 388, 769-774.
Maldonado D, Chirinos J, Benzo Z, Gomez C, Marcano E. (2006) *J. Anal. At. Spectrom.* 21, 743-749.
McLaughlin R L, Brindle I D. (2002) *J. Anal. At. Spectrom.* 17, 1540-1548.
Moor C, Lam J W H, Sturgeon R E. (2000) *J. Anal. At. Spectrom.* 15, 143-149.
Pohl P, Prusisz B. *Anal. Bioanal. Chem.* 388, 753-762.
Rojas I, Murillo M, Carrion N, Chirinos J. (2003) *Anal. Bioanal. Chem.* 376, 110-117.
Sturgeon R E, Mester Z. (2002) *Appl. Spectrosc.* 56, 202A-213A.
Tao G H, Sturgeon R E. (1999) *Spectrochim. Acta*, Part B. 54, 481-489.
Tian X-D, Zhuang Z-X, Chen B, Wang W-R. (1998) *Analyst.* 123, 627-632.
Vieira M A, Ribeiro A S, Curtius A J, Sturgeon R E. (2007) *Anal. Bioanal. Chem.* 388, 837-847.
Yin Y G, Liu J F, He B, Shi J B, Jiang G B. (2008) *J. Chromatogr. A.* 1181, 77-82.
Zheng C B, Li Y, He Y H, Ma Q, Hou X D. (2005) *J. Anal. At. Spectrom.* 20, 746-750.
Zheng C B, Sturgeon R E, Hou X D. (2009a) *J. Anal. At. Spectrom.* 24, 1452-1458.
Zheng C B, Ma Q, Wu L, Hou X D, Sturgeon R E. (2009b) *Microchem. J.* in press, doi:10.1016/j.microc.2009.09.010.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A photochemical vapour generator comprising: a reaction chamber having a liquid sample inlet, a carrier gas inlet and a carrier gas outlet; a liquid sample support surface for supporting a film of a liquid sample in the reaction chamber; and a source of ultraviolet radiation positioned in radiative contact with the liquid sample support surface, the ultraviolet source comprising an ultraviolet lamp or an ultraviolet LED, and the ultraviolet source further comprising:
  a coil that surrounds the reaction chamber and the liquid sample support surface, or straight discharge tubes configured around the reaction chamber and the liquid sample support surface and running up and down a length of the reaction chamber.

2. The generator according to claim 1, wherein the liquid sample support surface comprises one or more topographical features to increase residence time of the liquid sample in the reaction chamber.

3. The generator according to claim 2, wherein the one or more topographical features comprise one or more features to increase surface area of the liquid sample support surface, one or more features to direct flow of the liquid sample in a specific path, or a combination thereof.

4. The generator according to claim 2, wherein the topographical features comprise one or more of a threaded screw, a pattern of bumps, a pattern of depressions, a series of cups or rings that provide a cascade of flowing liquid, a tube, a channel, or a combination thereof.

5. The generator according to claim 2, wherein the topographical features comprise a threaded screw.

6. The generator according to claim 2, wherein the topographical features comprise a channel.

7. The generator according to claim 1, wherein the liquid sample support surface is a surface of a liquid sample support element separate from and housed within the reaction chamber.

8. The generator according to claim 7, wherein the liquid sample support element comprises a quartz rod.

9. The generator according to claim 7, wherein the liquid sample support element comprises a quartz channel.

10. The generator according to claim 1, wherein the reaction chamber further comprises a liquid waste outlet.

11. The generator according to claim 1, wherein the reaction chamber comprises a quartz tube.

12. The generator according to claim 1, wherein the reaction chamber comprises one or more caps and the one or more caps comprise the inlets and outlets.

13. The generator according to claim 1, wherein:
  (a) the reaction chamber comprises a vertically-oriented quartz tube, a first cap at a first end of the tube comprising the liquid sample inlet and carrier gas outlet, a second cap at a second end of the tube comprising the carrier gas inlet and a liquid waste outlet;
  (b) the liquid sample support surface is a surface of a quartz rod positioned concentrically in the quartz tube to permit the liquid sample to flow along the rod under influence of gravity from the first end to the second end; and,
  (c) the source of ultraviolet radiation comprises an ultraviolet coil lamp surrounding the quartz tube and quartz rod.

14. The generator according to claim 13, wherein the liquid sample support surface comprises a screw thread to increase surface area thereby increasing residence time of the film of liquid sample on the liquid sample support surface.

15. The generator according to claim 1, wherein:
  (a) the reaction chamber comprises a horizontally-oriented quartz tube, a first cap at a first end of the tube comprising the liquid sample inlet and carrier gas outlet, a second cap at a second end of the tube comprising the carrier gas inlet and a liquid waste outlet;
  (b) the liquid sample support surface is an inner surface of a quartz channel positioned in the quartz tube to permit the liquid sample to flow in the channel from the first end to the second end under control of an active flow regulator; and,
  (c) the source of ultraviolet radiation comprises an ultraviolet coil lamp surrounding the quartz tube and quartz channel or an ultraviolet lamp comprising straight discharge tubes configured around the quartz tube and quartz channel and running up and down a length of the quartz tube.

16. A process for detecting and/or quantifying an analyte comprising:
  providing a liquid film of a sample containing an organic acid or a salt thereof and a precursor compound of the analyte at a liquid sample support surface of a reaction chamber that has a liquid sample inlet, a carrier gas inlet, and carrier gas outlet;
  exposing the liquid film to ultraviolet radiation to generate a volatile species of the analyte by providing an ultraviolet source comprising an ultraviolet lamp or an ultraviolet LED, and the ultraviolet source further comprising either a coil that surrounds the reaction chamber and the liquid sample support surface, or straight discharge tubes configured around the reaction chamber and the liquid sample support surface and extending a length of the reaction chamber;

separating the volatile species from the liquid film to form a vapour containing the volatile species; and, directing the vapour to a detector to detect and/or quantify the analyte in the vapour.

17. The process according to claim 16, wherein the organic acid comprises formic acid, acetic acid, propionic acid or a mixture thereof, and the salt comprises a sodium salt, potassium salt or a mixture thereof.

18. The process according to claim 16, wherein separating the volatile species from the liquid film comprises stripping the volatile species from the liquid film with aid of a carrier gas.

19. The process according to claim 16, wherein the liquid film is provided without nebulization or aerosolization of the sample.

20. A photochemical vapour generator comprising:
a reaction chamber having a liquid sample inlet, a carrier gas inlet and a carrier gas outlet;
a liquid sample support surface for supporting a film of a liquid sample in the reaction chamber wherein the liquid sample support surface is a surface of a quartz rod that is separate from, and housed within, the reaction chamber; and,
a source of ultraviolet radiation positioned in radiative contact with the liquid sample support surface.

21. The generator according to claim 20, wherein the liquid sample support surface comprises one or more topographical features to increase residence time of the liquid sample in the reaction chamber.

22. The generator according to claim 21, wherein the one or more topographical features comprise one or more features to increase surface area of the liquid sample support surface, one or more features to direct flow of the liquid sample in a specific path, or a combination thereof.

23. The generator according to claim 21, wherein the topographical features comprise one or more of a threaded screw, a pattern of bumps, a pattern of depressions, a series of cups or rings that provide a cascade of flowing liquid, a tube, a channel, or a combination thereof.

24. The generator according to claim 21, wherein the topographical features comprise a threaded screw.

* * * * *